United States Patent [19]
Tani et al.

[11] Patent Number: 4,983,193
[45] Date of Patent: Jan. 8, 1991

[54] FILTER AND PROCESS FOR THE PRODUCTION THEREOF

[75] Inventors: Yatsuhiro Tani, Kyoto; Susumu Ohmori; Hideki Komagata, both of Otsu, all of Japan

[73] Assignees: Toyo Koseki Kabushiki Kaisha, Osaka; Nippondenso Co., Ltd., Kariya, both of Japan

[21] Appl. No.: 453,220

[22] Filed: Dec. 21, 1989

Related U.S. Application Data

[63] Continuation of Ser. No. 634,194, Jul. 27, 1984, abandoned, which is a continuation of Ser. No. 522,248, Aug. 11, 1983, abandoned, which is a continuation of Ser. No. 320,984, Nov. 12, 1981, abandoned.

[30] Foreign Application Priority Data

Nov. 12, 1980 [JP] Japan .................. 55-159959

[51] Int. Cl.$^5$ .............................. B01D 46/00
[52] U.S. Cl. ........................... 55/487; 55/524; 55/527; 55/528
[58] Field of Search ............ 55/486, 487, 524, 527, 55/528

[56] References Cited

U.S. PATENT DOCUMENTS

| | | | |
|---|---|---|---|
| 2,843,341 | 7/1958 | Dannenberg et al. | 55/487 X |
| 2,980,204 | 4/1961 | Jordan | 55/487 |
| 3,102,014 | 8/1963 | Aitkenhead | 55/487 X |
| 3,210,229 | 10/1965 | Feine | 55/487 X |
| 3,400,520 | 9/1968 | Sakurai | 55/487 |
| 3,410,062 | 11/1968 | Hart | 55/524 X |
| 3,570,224 | 3/1971 | Clemens | 55/487 X |
| 3,573,158 | 3/1971 | Pall et al. | 55/524 X |
| 3,594,993 | 7/1971 | Heyse | 55/524 |
| 3,686,837 | 8/1972 | Hopkins et al. | 55/487 |
| 3,798,104 | 3/1974 | Mallonee et al. | 55/524 X |
| 3,904,798 | 9/1975 | Vogt et al. | 55/487 X |
| 4,093,437 | 6/1978 | Ichiara et al. | 55/487 |
| 4,270,933 | 6/1981 | Meny et al. | 55/524 X |
| 4,286,977 | 9/1981 | Klein | 55/528 X |
| 4,350,507 | 9/1982 | Greenough et al. | 55/487 X |

*Primary Examiner*—Charles Hart
*Attorney, Agent, or Firm*—Jones, Tullar & Cooper, P.C.

[57] ABSTRACT

A filter for removing dust from fluids, which comprises fibers bonded each other with a binder and hot-pressed, having a fiber density of 0.01 to 0.1 at the fluid inlet side and a fiber density of 0.05 to 0.5 at the fluid outlet side with a continuous fiber density gradient and having a uniform distribution of fiber material in direction of thickness, and a process for the production thereof. The filter is particularly useful as an air filter for automobiles or air conditioners.

3 Claims, 3 Drawing Sheets

FIG. IA
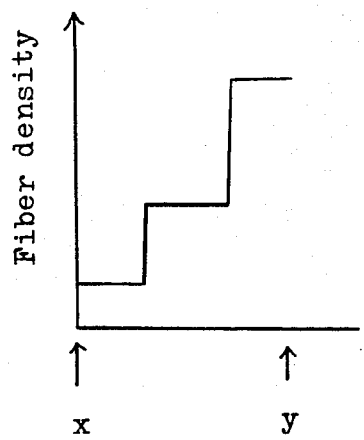
FIG. IB
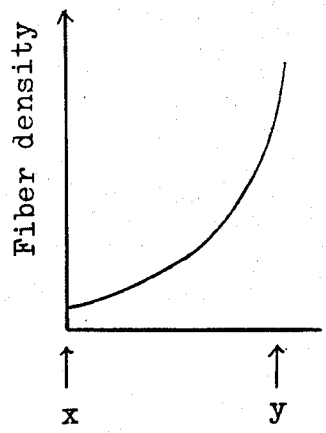
FIG. 2A
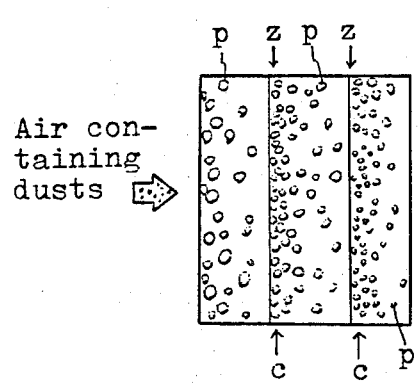
FIG. 2B
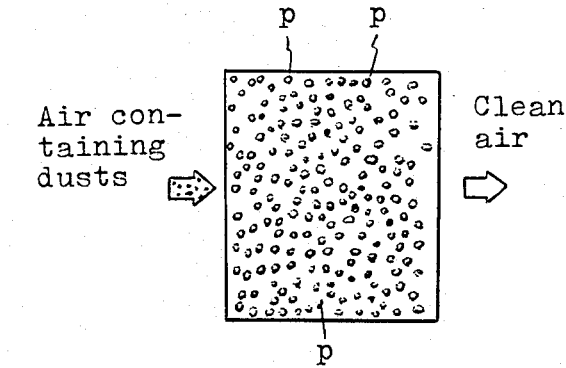

FILTER AND PROCESS FOR THE PRODUCTION THEREOF

This is a continuation of co-pending application Ser. No. 06/634,194 filed on July 27, 1984, now abandoned, which is a continuation of application Ser. No. 522,248, filed Aug. 11, 1983, now abandoned, which is a continuation of application Ser. No. 320,984, filed Nov. 12, 1981, now abandoned.

The present invention relates to a filter useful for removing dust from fluids with high dust collection efficiency and less clogging and a process for the production of the same.

Some laminated filters for removing dusts from fluids with high dust collection efficiency and little clogging are known. These filters are produced by laminating two or more non-woven fabrics having different kinds of fiber materials, different fiber deniers, different fiber densities and different thickness to provide non-woven fabric having low fiber density (sparse fiber layer) areas at the fluid inlet side to be and a non-woven fabric having high fiber density (dense fiber layer) areas at the fluid outlet side.

These laminated filters are produced by various processes, for example, by laminating various non-woven fabrics or by placing a plurality of webs of different fibers together followed by treating with a resin, and are usually used as a filter for gases such as an air filter for air-conditioners, an air filter for automobiles, or as a filter for liquids such as a fuel an oil filter for automobiles and airplanes. The laminated filters are superior to a filter having a single non-woven fabric layer in that they display less clogging and higher dust-holding capacity, but still have a drawback in that they have a relatively small dust-holding capacity per unit volume. That is, clogging tends to occur even when the laminated filters have a relatively large unit volume as a result the entire volume is not utilized since the fluid permeation resistance increases rapidly and as a result the useful life of the filter is shortened. Accordingly, the known laminated filters are not necessarily satisfactory in view of inferior space utilization.

The above drawback of the laminated filters may be due to easy formation a dust cake at the fluid inlet side which is unavoidable in case of laminated filters produced by laminating various non-woven fabrics wherein each non-woven fabric has a uniform fiber density.

As a result of the present inventors' intensive study, it has been found that an excellent filter having higher dust collection efficiency with less clogging can be obtained by producing a single layer filter under specified conditions so that the single layer has a continuous fiber density gradient (from sparse phase to dense phase) between the fluid inlet side and the fluid outlet side.

An object of the present invention is to provide an improved filter for removing dusts from fluids having high dust collection efficiency with less clogging. Another object of the invention is to provide a filter having a continuous fiber density gradient in a single layer. A further object of the invention is to provide a process for the production of the improved filter. These and other objects as well as advantages of the present invention will be apparent to persons skilled in the art from the following description.

The filter of the present invention is a single layer filter comprising fibers bonded each other with a binder and hot-pressed, having a fiber density of 0.01 to 0.1 at the fluid inlet side and a fiber density of 0.05 to 0.5 at the fluid outlet side with a continuous fiber density gradient therebetween and having a uniform distribution of fiber material in the direction of its thickness (i.e. cross-sectionally through the thickness of the filter between the inlet and outlet sides). The single layer filter may be used alone, or two or more of the single layer filters may be used together in the form of a multiple filter or further piling up with a conventional non-woven fabric as explained hereinafter. The filter of the present invention can be produced by passing a gas with a binder powder dispersed therein through fiber webs having a fiber density of $7 \times 10^{-4}$ to $1 \times 10^{-2}$ at a flow rate of not more than 4 m/second, by which an amount of binder equal to 10 to 80% by weight based on the weight of webs is adhered to the webs so that the adhered amount of the binder becomes rich at the surface layer of the webs and becomes poor at the opposite side, followed by hot pressing.

The filter of the present invention is characterized in that it is a single layer filter having a continuous fiber density gradient and has uniform distribution of fiber material, contrary to the known laminated filters formed by laminating two or more non-woven fabrics, wherein each non-woven fabric has a uniform fiber density but the non-woven fabric in one layer has a different fiber density from that of fabric in another layer, that is, the layer of the laminated filter at the fluid inlet side is composed of a non-woven fabric having a uniform low fiber density (sparse fiber layer) and the layer at the outlet side is composed of a non-woven fabric having a uniform high fiber density (dense fiber layer), and hence, the laminated filters have different fiber densities stepwise.

The uniform distribution of fiber material in the present filter means that the distribution of fiber material is uniform at any position in direction of thickness of the filter. For example, when the webs forming the filter consist of two kinds of fibers, a fiber of 1 denier and a fiber of 3 denier, both fibers are uniformly mixed at any position in direction of thickness.

The present invention is illustrated in more detail with reference to the accompanying drawings.

FIG. 1, A shows the degree of fiber density in direction of thickness of a known laminated filter, e.g. three-layer laminated filter. FIG. 1, B shows the degree of fiber density in direction of thickness of a filter of the present invention.

FIG. 2, A and B are schematic sectional views showing the state of collected dust in a known three-layer laminated filter and a filter of the present invention, respectively.

Figure 3:
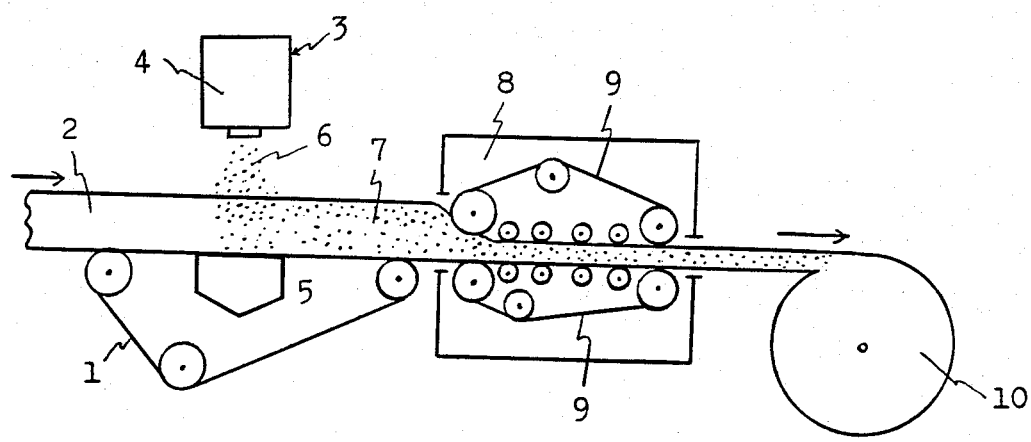
FIG. 3 shows a flow of steps for producing a filter by the present invention.

Referring to FIG. 1A, in the known three-layer laminated filter, the fiber density increases stepwise from the fluid inlet side (x) to the fluid outlet side (y), but on the other hand, referring to FIG. 1B, in the single layer filter of the present invention, the fiber density varies continuously from the fiber inlet side (x) to the fluid outlet side (y).

The filter of the present invention has a fiber density of 0.101 to 0.1 at the fluid inlet side and a fiber density of 0.05 to 0.4 at the outlet side, and has preferably a gradual fiber density gradient at the inlet side (x) and a sharp fiber density gradient at the outlet side (y).

The fiber density of the filter of the present invention may be controlled so as to be adapted to the kinds and particle distribution of dust contained in the fluid to be treated, but the fiber density gradient is preferably approximately shown by an exponential curve, i.e. a curve of the following equation.

$$\alpha = \alpha_i \cdot \exp \cdot \left( \frac{a}{\sqrt[3]{\alpha_i}} \times \frac{l}{lo} \right)$$

wherein
α: the fiber density at a distance: l,
$\alpha_i$: the fiber density at the fluid inlet side,
a: a constant: 0.35–0.64,
lo: the thickness of the filter, and
l: the distance from face at the fluid inlet side in direction of thickness.

When the fiber density gradient at the fluid inlet side is large (sharp), the filter shows a lower dust-holding capacity, and when the fiber density gradient at the fluid outlet side is smaller (gradual), the filter shows inferior dust collection efficiency. The fiber density in the present invention denotes a ratio ($cm^3/cm^3$) of a total volume of the fibers contained in the filter to a total volume of space in the filter.

The fibers used in the present filter include regular yarns having round cross-section and also special yarns having various other cross-sections such as Y-shaped cross-section, X-shaped cross-section, and C-shaped cross-section. Examples of the fibers are natural fibers such as cotton fiber, hempen fiber, wool fiber, or asbestos fiber, semi-synthetic fibers such as rayon fiber, viscose fiber or cellulose acetate fiber, synthetic fibers such as polyamide fiber (e.g. nylon fiber), polyester fiber, polyolefin fiber, polyvinylidene fluoride fiber, or sheath-core mixed type fibers therefrom, inorganic fibers such as glass fiber, rock wool fiber, slag wool fiber, or metallic fiber. The denier of the fibers is not specified, but usually in the range of 0.001 to 15 d, preferably 0.001 to 5 d. These fibers may be used alone or in combination of two or more kinds thereof. When two or more fibers are used together, they are uniformly mixed, because the filter of the present invention should have uniform distribution of fiber materials at any position.

The filter of the present invention consisting of a single layer may be used alone for removing dust from fluids with a high dust collection efficiency and less clogging, but two or more of the single layer filters may be used as a multiple filter by laminating them. Moreover, the single layer filter or multiple filter may also be used with a conventional non-woven fabric in order to give them higher degree of dust-holding capacity.

Since the filter of the present invention has a fiber density gradient, it shows remarkably efficient space utilization for collecting dusts and has a great dust-holding capacity. Referring to FIG. 2, A, according to the known three layer laminated filter, the dust particles (p) are collected as being biassed to the fluid inlet side (z) in each layer to form a dust cake (c), which results in significant increase of permeation resistance and finally ends its useful life. FIG. 2, A shows schematically the state of collected dust in the known laminated filter just before its usefulness ends. On the contrary, as is shown in FIG. 2, B, according to the filter of the present invention, even when the same amount of dust is collected, the dust particles (p) are uniformly collected in the direction of thickness and do not form any dust cake, because the present filter has a continuous fiber density gradient and hence the dust collection efficiency varies continuously from low efficiency to high efficiency from the fluid inlet side to the fluid outlet side.

Because of the excellent dust-holding capacity, the filter of the present invention is particularly useful as an air filter for air conditioners or an air filter for automobiles, but is also useful for other various utilities where conventional laminated filters are employed.

The filter of the present invention can be produced, for example, by the process as shown in FIG. 3.

On a screen conveyor (1), a web of fiber (2) is put, and thereon a binder (4) is sprayed from a binder dispersing machine (3). The binder-containing gas (6) is sucked with a suction box (5), by which the binder is penetrated into the a web. The binder-containing web (7) is then transferred into an electric furnace (8), wherein the web is hot-pressed with a pair of belts (9). The filter thus formed is wound onto a wind-up roll (10).

Figure 5:
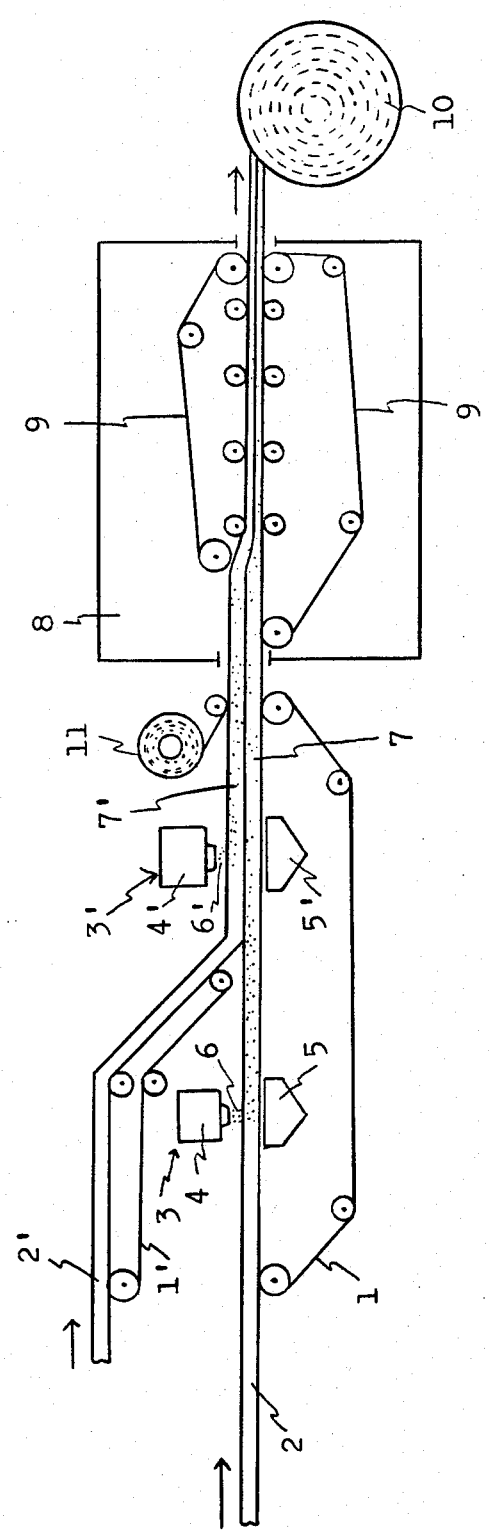
FIG. 5 shows a flow of steps in another embodiment of a process for the production of a filter by the present invention.

Another embodiment of the process of the present invention is shown in FIG. 5. According to this embodiment, a three layer filter consisting of two kinds of web and a non-woven fabric is produced. Firstly, web (2) is put on a belt conveyor (1), and thereto a binder is sprayed and penetrated like in FIG. 3. Onto the binder-containing web (7), another web (2') carried on a belt conveyor (1') is piled up and thereto a binder (4') is sprayed from a binder dispersing machine (3'), and the binder-containing gas (6') is sucked with a suction box (5') to form a binder-containing web layer (7'). Thereafter, a non-woven fabric (11) is piled up onto the layer (7'), and the thus formed three layer sheet is transferred into an electric furnace (8) and treated in the same manner as in FIG. 3.

According to the process of the present invention, the binder is penetrated and dispersed within the web with a gradient of adhered binder in direction of thickness (low adhesion amount to rich adhesion amount) by passing a binder-containing gas (e.g. air) through the web at a flow rate of not higher than 4 m/second. This dispersion of binder within the web can be carried out by spraying a binder with a spray gun, e.g. a spray gun for electrostatic powder coating onto the surface of the web and simultaneously sucking the binder-containing gas with a suction box as is shown in FIGS. 3 and 5. Alternatively, it may be carried out by dispersing and floating a quantitative amount of a binder in a fixed width with a rotary screen or a gravure roll.

The web used in the present invention has a fiber density of $7 \times 10^{-4}$ to $1 \times 10^{-2}$. A web having a comparatively small fiber density may be obtained by causing fiber crimp spontaneously or mechanically, and the web having a comparatively large fiber density may be obtained by compressing the web or from non-crimped fibers. When the web has a fiber density smaller than $7 \times 10^{-4}$, the binder can hardly be adhered onto the web because the binder passes through the web without being adhered, and hence, the desired gradient of adhered binder can hardly be obtained. On the other hand, when the fiber density is larger than $1 \times 10^{-2}$, the binder deposits predominantly on the surface of the web.

When the binder-containing gas (e.g. air), i.e. air wherein the binder is dispersed and floated, is passed through the web at a flow rate of not higher than 4 m/second, the binder contained in the gas is adhered into the web in such a binder distribution that the amount of adhered binder becomes larger at the surface of web layer and is rapidly decreased with distance from the surface to the reverse side of the web layer. When the flow rate of the binder-containing gas is larger than the above rate, 4 m/second, the binder adhered into the web is easily scattered from the web, and hence, it is difficult to control the amount of adhered binder.

In the process of the present invention, the binder-containing web is hot-pressed in the electric furnace. In this step, the web has a fiber density of not higher than 0.2, but not lower than the fiber density of the starting web. When the web is hot-presses, the binder contained therein is molten and then effects to bond each adjacent fibers in the web. The number of bonding points vary with the amount of adhered binder in the web. That is, when the amount of adhered binder is rich, the number of bonding points is many, and when the amount adhered of binder is poor, the number of bonding points is small. After passing the step of hot-pressing, the web layer is released from pressing, and thereby, the thickness of the web layer is somewhat recovered from that during the step of hot-pressing in the electric furnace. The elastic recovery of the web layer is smaller when the amount of adhered binder is rich, and is larger when the amount of adhered binder is poor, by which the continuous fiber density gradient results. When the fiber density of the web in the hot-pressing step is larger than 0.2, the bonding of fibers is effected not only between the adjacent fibers but also between fibers in surrounding area, by which the elastic recovery of the web layer becomes smaller even after release from pressing, and hence, the desired fiber density gradient is hardly obtained. Besides, when two or more webs are piled up and the binder is adhered with a desired adhesion gradient in each web, or when a non-woven fabric is further piled up thereon, followed by hot-pressing as in the process shown in FIG. 5, there can be obtained a multiple filter having a higher degree of dust-holding capacity.

The binder used in the present invention includes thermosetting resins such as phenol resins, melamine resins, epoxy resins, urea resins, alkyd resins, unsaturated polyester resins, silicone resins, urethane resins, or diallyl phthalate resins, thermoplastic resins such as polyamides, polyesters, polyethylene, polypropylene, polyvinyl chloride, polyvinyl acetate, polyvinyl alcohol, polyvinylidene chloride, polytetrafluoroethylene, or the like, which may be in the form of a powder or a liquid. When a powdery binder is used, it has a particle size of 1 to 150 $\mu$, preferably 10 to 100 $\mu$. When the fibers have smaller denier, the binder preferably has a smaller particle size. Besides, the binder particle distribution may be a polydisperse distribution (varying particle size) or a monodisperse distribution (uniform particle size). The powdery binder may be in a particle shape or alternatively may be a powdery fiber (fine fiber cut in a powdery state).

The binder is adhered onto the web in an amount of 10 to 80% by weight based on the weight of web. When the amount of binder adhered is over 80% by weight, the elastic recovery of the web layer becomes smaller when released from pressing in hot-pressing step, and hence, the fiber density gradient is hardly obtainable or the space for collecting dust becomes smaller, which results inadvantageously in lowering of the dust-holding capacity. On the other hand, when the amount of adhered binder is smaller than 10% by weight, the number of bonding points between fibers decreases and the filter obtained shows inferior dimensional stability, and hence, the desired filter can not be obtained.

The present invention is illustrated by the following Examples I-V but is not limited thereto. The following Reference Examples 1-14 illustrate comparison filters produced in a manner differing from that of the present invention.

EXAMPLE I

A filter was produced by the process as shown in FIG. 3.

Web (2) consisting of a polyester fiber of 3 denier (fiber weight per square meter: 400 g/m$^2$, fiber density: $2 \times 10^{-3}$) was put on a screen conveyor (1) which ran at a rate of 1 m/minute. Onto the web, a powdery binder (4) of a colored copolyester resin was sprayed at a rate of 60 g/m$^2$ from a binder dispersing machine (3) with a spray gun for powder coating, and simultaneously, the binder-containing air (6) was sucked at a rate of 1.0 m/second via the web (2) and the screen conveyor (1) with a suction box (5) which was provided under the screen conveyor (1). The powdery binder-containing web (7) was then transferred into an electric furnace (8) of 130° C., wherein the web was hot-pressed in a thickness of 3 mm with a pair of belts (9) which were coated with a polytetrafluoroethylene (Teflon, a tradename of Du Pont). After releasing from pressing, at which time the elastic recovery was measured, the hot-pressed web was wound up onto a wind-up roll (10) to give a filter having a thickness of 5 mm, a surface fiber density of 0.11, a reverse side fiber density of 0.03, and a continuous fiber density gradient. It was observed by a reflective microscope that the colored binder was rich in the surface area of the filter and the amount of adhered binder was gradually decreased with the distance from the surface to the reverse side, i.e. there was a gradient of adhered binder.

The filter thus obtained was subjected to the following test.

The filter was placed in a dusting tester (filtration area: 79 cm$^2$), and thereto was supplied air containing #8 testing dust (as defined in Japanese Industrial Standard) at a flow rate of 30 cm/second, and there were measured the initial collection efficiency at the point where permeation resistance was 10 mm H$_2$O, and an average collection efficiency and a dust-holding amount at the point where permeation resistance was 200 mm H$_2$O, The results are shown in Table 1.

TABLE 1

| Increase of permeation resistance (mm H$_2$O) | Collection efficiency (%) | Dust-holding amount (g/m$^2$) |
| --- | --- | --- |
| 10 | 96.3 | — |
| 200 | 99.7 | 2920 |

REFERENCE EXAMPLES 1 AND 2

For comparison purposes, a single layer filter was produced in the same manner as described in Example 1 except that the same powdery binder as used in Example 1 was uniformly dispersed and adhered to a card web consisting of a polyester fiber of 3 denier (fiber weight per square meter: 400 g/m$^2$) and the hot-pressing of the web was done to a thickness of 2.5 mm. The single layer filter thus obtained had a uniform fiber density (Reference Example 1).

Besides, a known three layer laminated filter was produced from a non-woven fabric consisting of a polyester fiber of 6 denier (fiber weight per square meter: 110 g/m$^2$, thickness: 2 mm), a non-woven fabric consisting of a polyester fiber of 3 denier (fiber weight per square meter: 120 g/m$^2$, thickness: 1 mm), and a non-woven fabric consisting of a rayon fiber of 1.5 denier (fiber weight per square meter: 150 g/m$^2$, thickness: 0.5 mm) (Reference Example 2).

The collection efficiency and dust-holding amount of these filters in reference examples were measured in the same manner as in Example 1. The results are shown in Table 2.

TABLE 2

| Ref. Ex. No. | Increase of permeation resistance (mm H$_2$O) | Collection efficiency (%) | Dust-holding amount (g/m$^2$) |
|---|---|---|---|
| Ref. Ex. 1 | 10 | 95.1 | — |
|  | 200 | 99.5 | 820 |
| Ref. Ex. 2 | 10 | 96.3 | — |
|  | 200 | 99.6 | 1360 |

As is clear from the comparison the results in Table 1 with those in Table 2, the filter of the present invention (Example 1) was the same as the laminated filter of Reference Example 2 in the collection efficiency, but was about two times of the latter in the dust-holding amount. The single layer filter of Reference Example 1 had a uniform fiber density and hence was inferior to the filter of the present invention both in the collection efficiency and the dust-holding amount.

EXAMPLE II

Onto a card web consisting of a mixture of 60% by weight of a polyester fiber of 1 denier and 40% by weight of a polyester fiber (triangle shape section) of 3 denier (fiber weight per square meter: 140 g/m$^2$, having uniform denier distribution in direction of thickness), air containing the same powdery binder as used in Example 1 was passed at a flow rate of 0.3 m/second, and thereby the powdery binder was adhered to the polyester fibers in the web, wherein the binder was adhered rich at the surface area and the amount of binder was decreased with the distance from the surface to the reverse side of webs.

The resulting web was hot-pressed at 140° C. in a gauge thickness of 1 mm for 2 minutes. After releasing from pressing, the elastic recovery was measured. There was obtained a single layer filter of a thickness of 1.2 mm, which had a fiber density at the inlet side of 0.02 and a fiber density at the outlet side of 0.09 and a continuous fiber density gradient.

The collection efficiency and dust-holding amount of the filter were measured in the same manner as in Example 1. The results are shown in Table 3.

REFERENCE EXAMPLE 3

For comparison purposes, a filter was produced in the same manner as described in Example 2 except that there was used a web having uneven fiber distribution which consisted of 100% by weight of a polyester fiber of 1 denier at the surface area of the web with increasing in straight line the content of a polyester fiber having triangle shape section of 3 denier from the surface to the reverse side of the web and becoming 100% by weight of the polyester fiber having triangle shape section of 3 denier at the reverse side of the web (fiber weight per square meter: 140 g/m$^2$). The properties of the filter were also measured likewise. The results are shown in Table 3, too.

TABLE 3

| Ex. No. | Increase of permeation resistance (mm H$_2$O) | Collection efficiency (%) | Dust-holding amount (g/m$^2$) |
|---|---|---|---|
| Ex. 2 | 10 | 98.0 | — |
|  | 200 | 99.7 | 490 |
| Ref. Ex. 3 | 10 | 98.2 | — |
|  | 200 | 99.7 | 260 |

REFERENCE EXAMPLES 4 TO 7

Four different kinds of filters having different fiber densities between the fluid inlet and outlet sides with continuous fiber density gradient as shown in Table 4 were produced by using the same card web as used in Example 2 in the same manner as described in Example 2 except that the conditions of hot-pressing temperature and gauge thickness were varied. The properties of these filters were measured likewise. The results are shown in Table 4.

TABLE 4

| Ex. No. | Increase of permeation resistance (mm H$_2$O) | Collection efficiency (%) | Dust-holding amount (g/m$^2$) | Fiber density at the side of inflow | Fiber density at the side of outflow |
|---|---|---|---|---|---|
| Ref. Ex. 4 | 10 | 98.8 | — | 0.08 | 0.50 |
|  | 200 | — | 65 |  |  |
| Ref. Ex. 5 | 10 | 98.2 | — | 0.007 | 0.16 |
|  | 200 | — | 220 |  |  |
| Ref. Ex. 6 | 10 | 98.5 | — | 0.15 | 0.20 |
|  | 200 | — | 70 |  |  |
| Ref. Ex. 7 | 10 | 95.1 | — | 0.01 | 0.04 |
|  | 200 | — | 380 |  |  |

EXAMPLES III AND IV

Card webs consisting of a polyester fiber of 5 denier were held between two screens of 50 mesh and pressed so as to provide fiber densities of $1 \times 10^{-3}$ and $4 \times 10^{-3}$. A powdery binder of a phenol resin was sprayed on theses webs from a powdery binder dispersing machine provided above the webs and the binder-containing air was penetrated into the webs at a flow rate of 1.5 m/second with a suction box provided under the webs, whereby the binder was adhered to the fibers so as to be rich at the side of inflow of fluid and to be poor at the side of outflow. The binder-containing webs were hot-pressed at 130° C. with a pressing machine to give two filters having a fiber density of 0.15.

The filters were subjected to the dusting test by using #2 testing dust (silica sand powder, defined in Japanese Industrial Standard) under the conditions of a filtration area: 79 cm², a flow rate of test fluid: 1.2 m/second, and a dust concentration in the fluid: 1 g/m³. The initial collection efficiency at a permeation resistance of 10 mm H₂O and the dust-holding amount a permeation resistance of 200 mm H₂O were measured. The results are shown in Table 5.

REFERENCE EXAMPLES 8 AND 9

For comparison purpose, the same webs as used in Examples 3 and 4 were held between two screens of 50 mesh and pressed so as to be a fiber density of $5 \times 10^{-4}$ and $1.5 \times 10^{-2}$. The webs were treated in the same manner as described in Examples 3 and 4, and the properties of the filters thus obtained were measured likewise. The results are shown in Table 5, too.

TABLE 5

| | | | Dusting property | |
|---|---|---|---|---|
| Ex. No. | Fiber density of the web (cm³/cm³) | Adhesion amount of binder (g/m²) | Thickness of filter (mm) | Initial collection efficiency (%) | dust-holding amount (g/m²) |
| Ref. Ex. 8 | 0.0005 | 37 | 1.2 | 99.3 | 800 |
| Ex. 3 | 0.001 | 42 | 1.8 | 98.9 | 2900 |
| Ex. 4 | 0.004 | 40 | 2.5 | 98.2 | 3200 |
| Ref. Ex. 9 | 0.015 | 43 | 3.7 | 71.2 | 3100 |

As is clear from the above results, the filters of Examples 3 and 4 showed large dust-holding amounts with a high initial collection efficiency.

Figure 4:
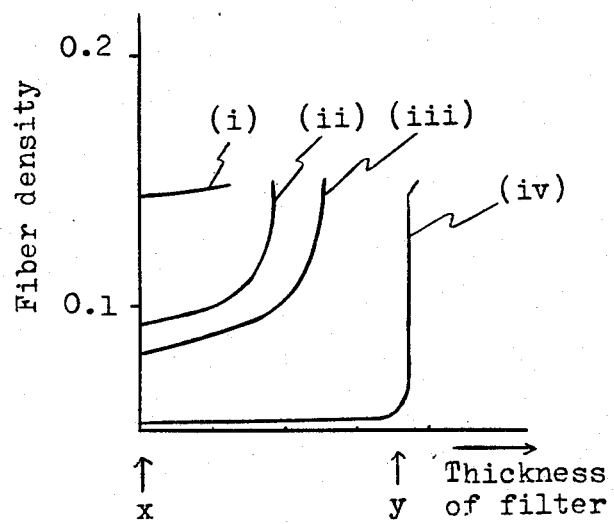
FIG. 4 shows the variation of fiber density in direction of thickness in a known laminated filter and the present filter.

The change of fiber density in direction of thickness in each filter is shown in FIG. 4, wherein (i) is the change of fiber density of the filter in Reference Example 8, (ii) is that of the filter in Example 3, (iii) is that of the filter in Example 4, and (iv) is that of the filter in Reference Example 9. In case of Reference Example 8, the fiber density of the web was small at the spraying of the powdery binder, and the powdery binder was adhered comparatively uniformly in direction of thickness and the web was hot-pressed with keeping the uniform fiber density, and hence, the obtained filter showed inferior dust-holding capacity. In case of Examples 3 and 4, the filters had a gradual gradient of fiber density at the fluid inlet side (x) and, a sharp gradient of fiber density at the fluid outlet side (y), and the fiber density gradient was approximately in an exponential curve, and hence, the filters showed excellent dust-holding capacity. In case of Reference Example 9, the fiber density of the web was large at the spraying of the powdery binder, and hence, the powdery binder adhered merely on the surface area of the web, that is, the phase being effective on the initial collection efficiency was merely restricted to the surface area of the filter.

EXAMPLE V

A multiple filter consisting of two webs (2 and 2') and non-woven fabric (11) was produced by the process as shown in FIG. 5.

Two kinds of webs (2 and 2') were put on screen conveyors (1 and 1') which ran at a rate of 1.5 m/minute, respectively. To the webs (2 and 2') were adhered powdery binders of a copolyester resin (4 and 4') under the conditions of a supplying amount of the binder: 10 g/minute and 30 g/minute, and a flow rate of air containing the binders by sucking with suction boxes (5 and 5'): 1.0 m/second in each suction. The binder-containing webs (7 and 7') were piled up with a non-woven fabric (11) and the piled sheet was hot-pressed in an electric furnace (8) at 130° C.

The web (2) used above consisted of a polyester fiber of 6 denier, and had a fiber weight per square meter of 400 g/m² and a fiber density of $2.3 \times 10^{-3}$. The web (2') consisted of a polyester fiber of 2 denier, and had a fiber weight per square meter of 100 g/m² and a fiber density of $3.0 \times 10^{-3}$. The non-woven fabric (11) consisted of a polyester fiber and had a fiber weight per square meter of 50 g/m². The hot-pressing was done at a gauge thickness of 4.5 mm, and the filter thus obtained had a thickness of 6.2 mm.

The filter was provided onto a dusting tester (filtration area: 79 cm²), and thereto was supplied an air containing #7 testing dust (as defined in Japanese Industrial Standard) at a flow rate of 30 cm/second, and there were measured the initial collection efficiency at a permeation resistance of 10 mm H₂O, and an average collection efficiency and a dust-holding amount at a permeation resistance of 200 mm H₂O. The results are shown in Table 6.

TABLE 6

| Increase of permeation resistance (mm H₂O) | Collection efficiency (%) | Dust-holding amount (g/m²) |
|---|---|---|
| 10 | 99.0 | — |
| 200 | 99.9 | 4500 |

REFERENCE EXAMPLES 10 TO 13

Various filters were produced in the the same manner as described in Example 1 except that the amount of adhered binder and the fiber density at the hot-pressing were varied as shown in Table 7. The properties of the filters were measured likewise. The results are shown in Table 7. As is clear from the results, the filters showed inferior balance in the collection efficiency and the dust-holding amount.

TABLE 7

| | | | Dusting property | | | |
|---|---|---|---|---|---|---|
| Ex. No. | Amount of adhered binder (% by weight) | Fiber density at hot-pressing | Increase of permeation resistance (mm H₂O) | Collection efficiency (%) | Dust-holding amount (g/m²) | Initial permeation resistance mm H₂O |
| Ref. Ex. 10 | 100 | 0.12 | 10 | 98.5 | — | 21 |
| | | | 200 | — | 65 | |
| Ref. Ex. 11 | 150 | 0.30 | 10 | — | — | Extremely large |
| | | | 200 | — | — | |
| Ref. Ex. 12 | 40 | 0.30 | 10 | 98.7 | — | 15 |
| | | | 200 | — | 60 | |
| Ref. Ex. 13 | 5 | 0.13 | 10 | 96.1 | — | 5 |
| | | | 200 | — | 400 | |

The filter obtained in Reference Example 11 showed almost no air permeation because of film-formation of the binder, and it could not be used as a filter.

REFERENCE EXAMPLE 14

A filter was produced in the same manner as described in Example 1 except that the flow rate of the binder-containing air was 5 m/second. The filter showed a collection efficiency of 97.9% (at a permeation resistance of 10 mm H$_2$O) and a dust-holding amount of 180 g/m$^2$ (at a permeation resistance of 200 mm H$_2$O), which were not satisfactory.

What is claimed is:

1. A filter having an inlet side and an outlet side, comprising at least two different types of fibers having a denier of 0.001 to 15 bonded to each other with a powdery binder of 10 to 80% by weight based on the weight of webs, said binder being hot-adhered to the webs, said filter having a fiber density of 0.01 to 0.1 at the inlet side and a fiber density of 0.05 to 0.5 at the outlet side, said filter having a continuous fiber density gradient from the inlet side to the outlet side owing to a continuous distribution gradient of the powdery binder which bonds to the fibers while having a uniform distribution of the different types of fiber so that dust collection efficiency varies continuously from low efficiency at the inlet side to high efficiency toward the outlet side, thereby preventing formation of a dust cake at the inlet side and promoting uniform collection of dust throughout the thickness of the filter between the inlet and outlet sides, said fiber density gradient corresponding to an exponential curve defined by the following equation:

$$\alpha = \alpha_i \cdot \exp\left(\frac{a}{\sqrt[3]{\alpha_i}} \times \frac{l}{l_o}\right)$$

wherein
  $\alpha$ is the fiber density at a distance: l,
  $\alpha_i$ is the fiber density at the fluid inlet side,
  a is a constant: 0.35–0.64,
  $l_o$ is the thickness of the filter, and
  l is the distance from a face at the fluid inlet side in the direction of the filter thickness.

2. A filter according to 1 which is in the form of a laminate of at least two filters.

3. A filter according to 1 which is laminated with a non-woven fabric.

* * * * *

UNITED STATES PATENT AND TRADEMARK OFFICE
CERTIFICATE OF CORRECTION

PATENT NO. : 4,983,193
DATED : January 8, 1991
INVENTOR(S) : Yatsuhiro Tani et al It is certified that error appears in the above-identified patent and that said Letters Patent is hereby corrected as shown below:

Claim 1, column 11, line 22, "fiber" should be "fibers".

Claim 2, column 12, line 20, "claim" should be inserted between "to" and "1".

Claim 3, column 12, line 22, "claim" should be inserted between "to" and "1".

The first assignee should be changed from "Toyo Koseki Kabushiki Kaisha" to "Toyo Boseki Kabushiki Kaisha".

Signed and Sealed this

Eighth Day of September, 1992

*Attest:*

DOUGLAS B. COMER

*Attesting Officer*      *Acting Commissioner of Patents and Trademarks*